3,124,421
PROCESS FOR MANUFACTURING HYDROGEN PEROXIDE
Werner Lohringer and Johann Sixt, both of Munich, Bavaria, Germany, assignors to Wacker-Chemie G.m.b.H., Munich, Bavaria, Germany, a corporation of Germany
No Drawing. Filed July 27, 1959, Ser. No. 829,495
Claims priority, application Germany Sept. 16, 1958
8 Claims. (Cl. 23—207)

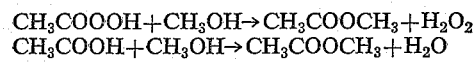

This invention relates to the manufacture of hydrogen peroxide, and it has for its object to provide a novel and improved process for this purpose.

Another object of the invention is to provide a simple and expeditious process for producing hydrogen peroxide in extremely satisfactory yields.

Still another object is to utilize organic peracids for the manufacture of hydrogen peroxide which is free of organic acids and peracids.

Various other objects and advantages will be apparent as the nature of the invention is more fully disclosed.

It is known that the organic peracids can be hydrolyzed with water in a reversible reaction into hydrogen peroxide and the corresponding organic acid. In the equilibrium, however, considerable quantities of peracid are present even in case of a larger water content, so that the yield of hydrogen peroxide is comparatively small. Besides, the quantity of the peracid is increased when the process is performed in the presence of saponification catalysts, such as sulphuric acid, especially when such solutions are distilled. Therefore no hydrogen peroxide could be expected on the basis of these chemical conditions that would be free from any noxious organic peracid.

We have now discovered that it is surprisingly easy, with a rapid reaction and excellent yield, to obtain hydrogen peroxide from organic peracids, such peroxide being free of troublesome peracid and/or organic acid with which the hydrogen peroxide could react mutually, if the peracid is converted with alcohol in the presence of an esterification catalyst at temperatures preferably below 100° C., whereby hydrogen peroxide and organic acylester are formed, and the hydrogen peroxide thus produced is separated from the organic ester. The use of peracetic acid and perpropionic acid is particularly advantageous. Besides other known esterification catalysts, sulphuric acid and cation exchangers are especially suitable. At the same time during this reaction the corresponding non-peroxidized organic acids which are contained in the peracids, perhaps as a thinner, are also esterified.

In order to obtain pure hydrogen peroxide, the ester can be easily removed from the system. But the simplest way is to eliminate it by distillation after alcohols having 1–7 carbon atoms have been added, where due to the continuous removal of the troublesome organic acid component the equilibrium is shifted more and more toward the side of the hydrogen peroxide which is left as a residue.

Basically, aliphatic, cyclic and mixed aromatic alcohols can be used for the reaction. For the separation by distillation in the present process alcohols with a low boiling point, such as especially methyl alcohol and ethyl alcohol, are useful. In order to esterify the peracid and also the acetic acid, for instance, a mixture of peracetic acid-glacial acetic acid of a quantity slightly more than the theoretical is mixed with methyl alcohol in the presence of about 2–6 parts by weight of concentrated sulphuric acid and/or phosphorous acid, or up to about 50 parts by weight cation exchanger, per 100 parts by weight of starting reactant materials and distilled, where during the reaction and also during the distillation normal pressure or, if necessary, a slight vacuum can be applied. The formation of the ester and hydrogen peroxide begins at once and methyl acetate begins to distill over. The transformation can be described by the equation:

$$CH_3COOOH + CH_3OH \rightarrow CH_3COOCH_3 + H_2O_2$$
$$CH_3COOH + CH_3OH \rightarrow CH_3COOCH_3 + H_2O$$

Here it remains uncertain whether acetic acid is formed as an intermediate by hydrolysis from peracid. The transformation into methyl acetate is practically quantitative.

Distillation is continued until all the ester has gone over, which can be noticed by the rising temperature.

The distillation residue contains the hydrogen peroxide formed in an equivalent quantity in mixture with water. The former derives from the peracid, the latter from the acetic acid of the mixture which is also present. The residue also contains the added esterification catalyst and perhaps small quantities of alcohol. It is not necessary to add water in order to set off the esterification reaction. If the content of organic acid is larger, naturally more water is formed. At any rate a comparatively concentrated aqueous hydrogen peroxide solution remains in the residue. Consequently a hydrogen peroxide solution containing very little water can be obtained from peracid-carboxylic acid mixtures with high peracid concentration, perhaps diluted with inert solvents. In order to avoid an explosion, however, $H_2O$ can be added when distilling off the excess alcohol.

Instead of separating the ester by separate batch distillation methods, a continuous distillation method can also be used, for instance by running in the reaction fluid at an appropriate section of the column while piping off the ester at the head of the column and taking off the hydrogen peroxide solution at the lower end.

The separation of the aqueous hydrogen peroxide solution can further be made possible by aiding the formation of an ester layer after perhaps adding ligroin or petrol ether and possibly water.

The further treatment of the hydrogen peroxide solution for the purpose of separating the catalyst and the alcohol which may still be present, can be done by distillation as well as filtration or in any other suitable way.

The ester obtained in each case can either be used as a solvent or split up into its natural components, namely organic acid and alcohol. In the latter case the alcohol as well as the recovered esterification catalyst can be recycled into the process.

*Example 1*

36 parts by weight of a mixture of peracetic acid and glacial acetic acid with the mixture containing 42.6% by weight of peracid are mixed with 30 parts by weight of methanol and 2.5 parts of concentrated sulphuric acid under cooling and subsequently warmed up to 60° C. and subjected to fractional distillation under normal pressure, until methyl acetate, which goes over at 53° C. is entirely driven off. A small part of the methanol which did not go over with the methyl acetate is subsequently separated by fractional distillation from the residue under a slight vacuum. The result is a hydrogen peroxide solution which is practically free of peracetic acid and acetic acid and contains 45% by weight of hydrogen peroxide. There is no loss of active oxygen with this operation.

*Example 2*

36 parts by weight of a mixture of peracetic acid and glacial acetic acid with the mixture containing 40% by weight of peracetic acid are mixed with 50 parts by weight of ethyl alcohol and 3.6 parts of concentrated sulphuric acid and heated for some time in a reflux condenser in slight vacuum, where the temperature does not exceed 65° C. Then ethyl acetate which has formed is distilled off under slight vacuum, where the vacuum is gradually increased to about 150 mm. of the mercury column towards the end of the distillation. Ten parts by weight of water are now added for dilution of the liquid, and the distillation is continued until practically no alcohol goes over any more. The residue, whose quantity is 18.5 parts by weight, contains essentially hydrogen peroxide, water and the esterification catalyst, sulphuric acid. Peracid and acetic acid are no longer present. During analysis for active oxygen it is found that the entire amount of peracid is converted without loss into hydrogen peroxide. The solution contains 34.5% by weight of hydrogen peroxide. The proportion of hydrogen peroxide can be increased when a little water is added before or during the distillation.

*Example 3*

1 mol (76 g.) of peracetic acid mixed with 50 g. of glacial acetic acid is mixed with 200 ccm. of methanol and 30 g. of a strongly acid organic ion exchanger, commercially obtainable under the name "Amberlite IR–120," and treated for a while at 65° C. The conversion of the peracid into hydrogen peroxide-methyl acetate yields about 85%. By fractional distillation of the methyl acetate the equilibrium is further shifted in favor of the hydrogen peroxide, so that the entire peracid has transformed at the end of the distillation. The solution contains 66% by weight of hydrogen peroxide and has a low content of methyl alcohol. There are no losses of active oxygen. The concentrated pure hydrogen peroxide solution is separated from the cation exchanger. It can be reused without any further purification. The raw solutions treated with other catalysts, as well as the above solutions, can be used for various purposes, for instance for organic oxidations, without separating alcohol and ester.

*Example 4*

A mixture of 0.2 mol (15.2 g.) peracetic acid and 10 g. of glacial acetic acid are mixed with 50 g. butyl alcohol and 4 g. sulphuric acid and maintained for one hour at 80° C. for accelerating the esterification. After cooling, 180 g. of petroleum ether and 20 g. water are added to support the separation of the layers and the hydrogen peroxide layer is separated. There is no loss of active oxygen.

*Example 5*

60 g. of a mixture of perpropionic acid and propionic acid, the mixture containing 30% by weight perpropionic acid, are used as starting material and mixed with 100 g. methanol in the presence of 3 g. of concentrated sulphuric acid. Immediately after the mixing, distillation starts and methyl-propionate and finally excessive methanol out of hydrogen peroxide is distilled off by low pressure. The entire theoretical amount of hydrogen peroxide is found in the residue.

The invention claimed is:

1. Process for producing hydrogen peroxide which comprises reacting an organic peracid selected from the group consisting of peracetic and perpropionic acids with an aliphatic primary alcohol having 1 to 4 carbon atoms in the presence of an acidic esterification catalyst selected from the group consisting of sulphuric acid, phosphoric acid, and a strongly acidic cation-exchange resin at a temperature below 100° C. and separating the resulting organic ester from the hydrogen peroxide.

2. Process according to claim 1, in which the alcohol is selected from the group consisting of methyl alcohol and ethyl alcohol.

3. Process according to claim 1, in which the esterification catalyst is concentrated sulphuric acid.

4. Process for producing hydrogen peroxide which comprises reacting a mixture of peracetic acid and glacial acetic acid with a member of the group consisting of methyl alcohol and ethyl alcohol in the presence of an acidic esterification catalyst selected from the group consisting of concentrated sulphuric acid, concentrated phosphoric acid, and a strongly acidic cation-exchange resin at a temperature below 100° C., removing the resulting acetic acid ester from the reaction liquid by fractional distillation, and recovering the hydrogen peroxide solution.

5. Process for producing hydrogen peroxide which comprises reacting a mixture of perpropionic acid and propionic acid with a member of the group consisting of methyl alcohol and ethyl alcohol in the presence of an acidic esterification catalyst selected from the group consisting of concentrated sulphuric acid, concentrated phosphoric acid, and a strongly acidic cation-exchange resin at a temperature below about 100° C., removing the resulting acetic acid ester from the reaction liquid by fractional distillation, and recovering the hydrogen peroxide solution.

6. Process for producing hydrogen peroxide which comprises reacting 36 parts by weight of a mixture of peracetic acid and glacial acetic acid, said mixture containing 42.6% by weight peracetic acid, at a temperature of about 60° C. with 30 parts by weight of methanol in the presence of 2.5 parts by weight of concentrated sulphuric acid, removing the resulting methyl acetate from the reaction liquid by distillation, and recovering the hydrogen peroxide.

7. Process for producing hydrogen peroxide which comprises reacting 36 parts by weight of a mixture of peracetic acid and glacial acetic acid, said mixture containing 40% by weight peracetic acid, at a temperature of about 65° C. with 50 parts by weight of ethyl alcohol in the presence of 3.6 parts by weight of concentrated sulphuric acid, removing the resulting ethyl acetate from the reaction liquid by distillation, and recovering the hydrogen peroxide solution.

8. Process for producing hydrogen peroxide which comprises reacting a mixture of 15.2 parts by weight peracetic acid and 10 parts by weight of glacial acetic acid with 50 parts by weight butyl alcohol in the presence of 4 parts by weight sulphuric acid for one hour at a temperature of about 80° C., and separating the resulting hydrogen peroxide from the reaction mixture.

References Cited in the file of this patent

UNITED STATES PATENTS

| | | |
|---|---|---|
| 1,660,756 | Lichtenthaeler | Feb. 28, 1928 |
| 2,910,504 | Hawkinson | Oct. 27, 1959 |

OTHER REFERENCES

Bobtelsky et al.: "Catalyst for Peroxide Decomposition, II, The Catalytic Decomposition of Hydrogen Peroxide by Chromic Acid and Dichromate," Journal American Chemical Society, vol. 67, 1945, pp. 966–75.

Bunton et al.: "Tracer Studies in the Formation and Reactions of Organic Peracids," Journal of the Chemical Society of London, 1956, part I, pp. 1266–1230.

Hatcher et al.: "Transactions of Royal Society of Canada (3), 18, section B, pp. 242–243.